S. T. ALLEN.
TRACTOR WHEEL.
APPLICATION FILED APR. 15, 1918.

1,302,269.

Patented Apr. 29, 1919.
2 SHEETS—SHEET 1.

Inventor:
Sherman T. Allen,
by Hazard & Miller
Att'ys.

S. T. ALLEN.
TRACTOR WHEEL.
APPLICATION FILED APR. 15, 1918.

1,302,269.

Patented Apr. 29, 1919.
2 SHEETS—SHEET 2.

Inventor:
Sherman T. Allen,
by Hazard & Miller
Att'ys.

UNITED STATES PATENT OFFICE.

SHERMAN T. ALLEN, OF LOS ANGELES, CALIFORNIA.

TRACTOR-WHEEL.

1,302,269.  Specification of Letters Patent.  Patented Apr. 29, 1919.

Application filed April 15, 1918. Serial No. 228,772.

*To all whom it may concern:*

Be it known that I, SHERMAN T. ALLEN, a citizen of the United States, residing at Los Angeles, in the county of Los Angeles and State of California, have invented new and useful Improvements in Tractor-Wheels, of which the following is a specification.

My invention relates to tractor wheels and consists of the novel features herein shown, described and claimed.

Figure 1:
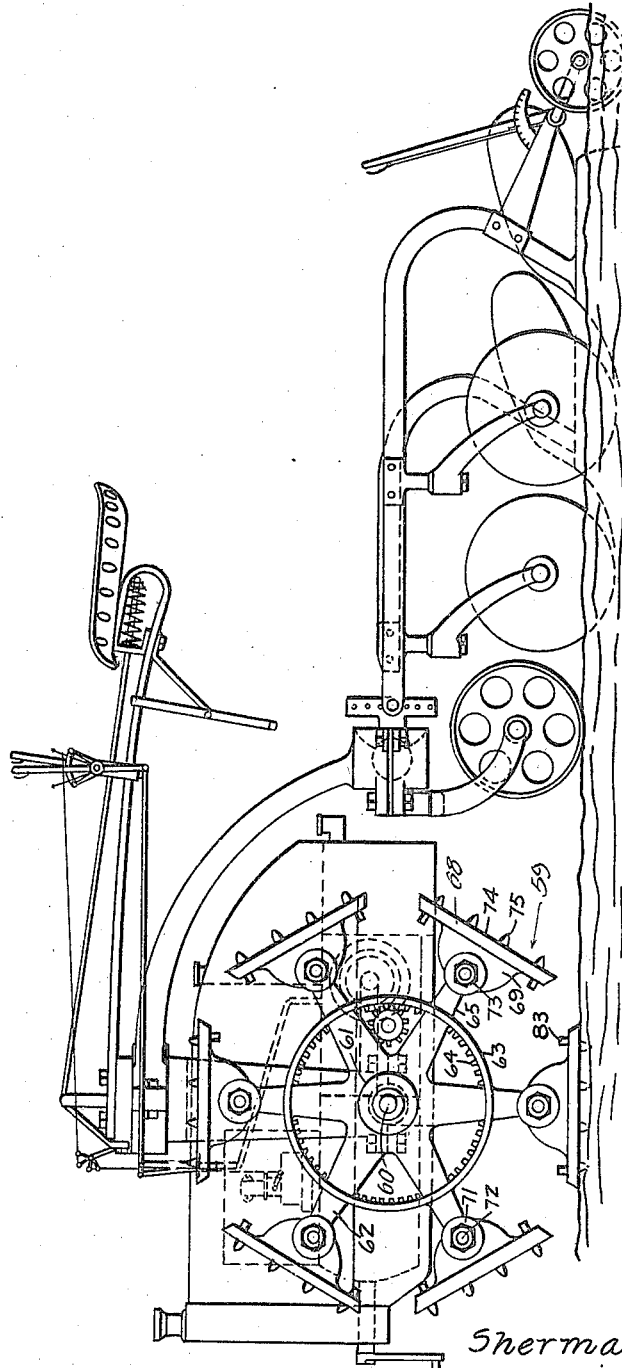
Figure 1 is a side elevation of a farm tractor having a tractor wheel embodying the principles of my invention.
Figure 2:
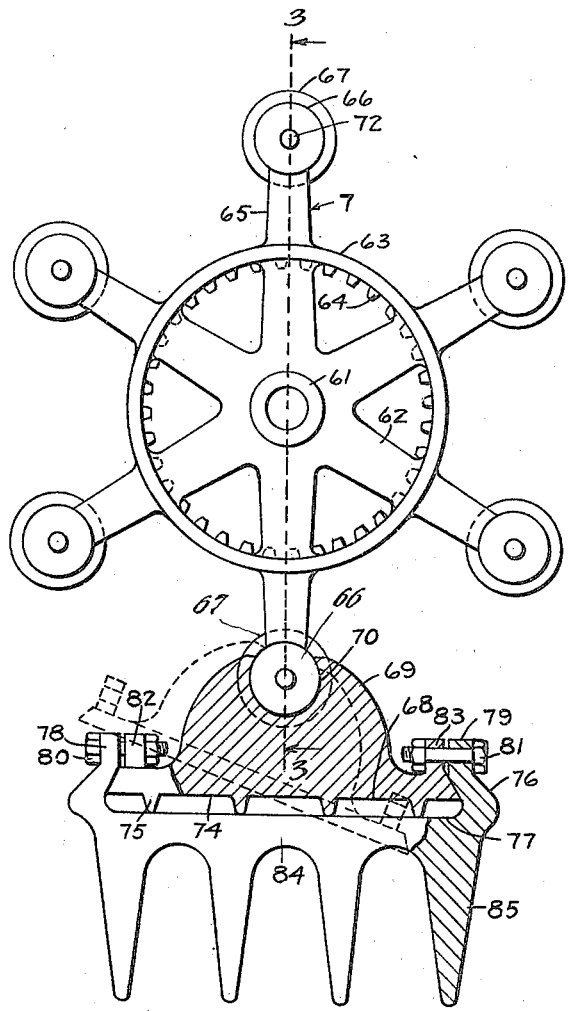
Fig. 2 is a detail view of the tractor wheel showing a tractor foot provided with a shoe having long teeth adapted to dig up and pulverize the soil.
Figure 3:
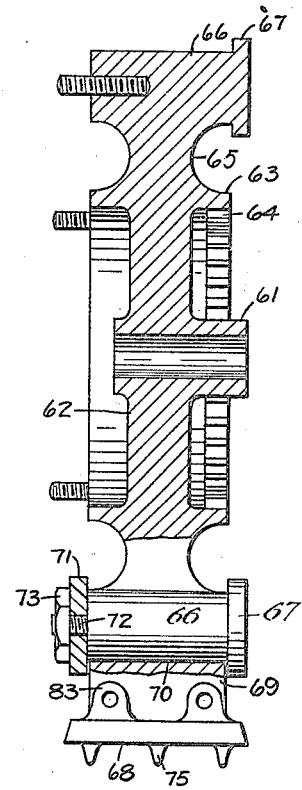
Fig. 3 is a sectional detail on the line 3—3 of Fig. 2.

The wheel 59 is mounted upon an axle 60 and the wheel 59 comprises a hub 61, spokes 62 extending outwardly from the hub, an annular flange 63 connecting the ends of the spokes and extending inwardly from the spokes, an internal gear 64 extending inwardly from the flange 63, arms 65 extending outwardly from the flange 63 in line with the spokes, and bearing members 66 upon the outer ends of the arms 65, said bearing members 66 being semi-cylindrical and there being heads 67 on the outer ends of the bearing members. The hub 61 runs loosely upon the end of the axle 60. The tractor feet plates 68 have heads 69 provided with slotted bearings 70, so that the bearing members 66 will enter the bearings 70 endwise. Washers 71 are placed against the ends of the bearing members 66 and against the ends of the heads 69. Studs 72 are tapped into the ends of the bearing members 66 and nuts 73 are applied to the outer ends of the studs against the washers to hold the tractor feet in place. The slots in the bearings 70 are wide enough to allow the feet to oscillate upon the bearing members 66. The lower faces 74 of the plates 68 are flat and are provided with growser teeth 75, said teeth being comparatively short and for traveling upon a field and pulling the load under ordinary conditions.

I prefer to use six of the tractor feet 68 to a wheel and to make the plates large enough in proportion to the size of the wheel so that the feet will follow closely one after the other. The supplemental shoes 76 have flat upper faces 77 upon which the teeth 75 will rest, and arms 78 and 79 extend upwardly from the sides of the faces 77 and inwardly to form a dove-tail slot in which the front and rear bevel faces of the plates 68 will fit and bolts 80 and 81 are inserted through the arms 78 and 79 and through ears 82 and 83 extending upwardly from the plates 68, so as to hold the supplemental shoes in place upon the tractor feet. The faces 77 are formed upon the shoe plates 84 and long growser teeth 85 extend downwardly from the plate 84, said teeth being adapted for use upon stubble fields and the like, and said teeth serving not only to give tractor force to the machine, but said teeth will serve to dig up and pulverize the ground.

When desired the bolts 80 and 81 may be removed and the shoes 76 removed.

For light farm work the tractor feet 68 with the short teeth 75 will be sufficient but for pulling heavy farm implements the supplemental shoes with the long growser teeth 85 will be necessary.

Thus I have produced a tractor wheel for farm tractors and the like, having flat-faced tractor feet which provide greatly increased traction force over any of the forms of circular rims and without going to the trouble of making belt treads, as in the caterpillar constructions, and provided means whereby the traction force of the tractor feet may be readily changed by adding or removing shoes.

Various changes may be made without departing from the spirit of my invention, as claimed.

I claim:

1. A tractor wheel comprising a hub, a rigid frame extending outwardly from the hub, bearing members extending outwardly from the frame, and tractor feet having slotted bearings to slide endwise on to said bearing members, so as to pivotally mount the feet upon the frame.

2. A tractor wheel comprising a hub, a rigid frame extending outwardly from the hub, bearing members extending outwardly from the frame; the axes of the bearing members being parallel with the axis of the wheel; flat-faced tractor feet having slotted bearing openings to receive the bearing members, and teeth extending from the flat faces.

3. A tractor wheel comprising a hub, a rigid frame extending outwardly from the hub, bearing members extending outwardly from the frame; the axes of the bearing members being parallel with the axis of the wheel; heads upon the bearing members, tractor feet having slotted bearings to receive the bearing members and fitting against the heads, studs extending from the opposite ends of the bearing members from the heads, washers upon the studs against the tractor feet, and nuts upon the studs.

4. A tractor wheel comprising a hub, a rigid frame extending outwardly from the hub, bearing members extending outwardly from the frame, tractor feet having slotted bearings to slide endwise on to said bearing members so as to pivotally mount the feet upon the frame, supplemental shoes fitting the tractor feet, means for holding the shoes removably in place, and growser teeth extending from the supplemental shoes.

In testimony whereof I have signed my name to this specification.

SHERMAN T. ALLEN.

Copies of this patent may be obtained for five cents each, by addressing the "Commissioner of Patents, Washington, D. C."